(12) United States Patent
Lee (10) Patent No.: US 7,620,971 B2
(45) Date of Patent: Nov. 17, 2009

(54) SET-TOP BOX ALLOWING KEY COMMAND INPUT WHILE DISPLAYING ANIMATION SEQUENCE ON OSD SCREEN AND METHOD OF DISPLAYING OSD DATA

(75) Inventor: Jae-joon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 11/168,558

(22) Filed: Jun. 29, 2005

(65) Prior Publication Data

US 2006/0005220 A1    Jan. 5, 2006

(30) Foreign Application Priority Data

Jun. 29, 2004    (KR)    ............ 10-2004-0049649

(51) Int. Cl.
*G06F 7/00*    (2006.01)
(52) U.S. Cl. ............ 725/151; 348/734; 348/569; 715/720
(58) Field of Classification Search ............ 725/39–55; 345/473–475; 715/720
See application file for complete search history.

(56) References Cited

U.S. PATENT DOCUMENTS

| 5,969,727 | A | 10/1999 | Kaneko | |
| 6,181,337 | B1* | 1/2001 | Okawa et al. | 715/768 |
| 6,750,918 | B2* | 6/2004 | Aneja et al. | 348/569 |
| 7,155,674 | B2* | 12/2006 | Breen et al. | 715/719 |

FOREIGN PATENT DOCUMENTS

| EP | 0 537 721 A2 | 4/1993 |
| EP | 0 568 356 A2 | 11/1993 |
| JP | 10-187126 | 7/1998 |
| KR | 10-2002-0001131 A | 1/2002 |
| KR | 10-2003-0014816 A | 2/2003 |
| KR | 10-2004-0025073 A | 3/2004 |
| WO | WO 96/38008 | 11/1996 |

* cited by examiner

*Primary Examiner*—Andrew Y Koenig
*Assistant Examiner*—Jasmine Stokely-Collins
(74) *Attorney, Agent, or Firm*—Roylance, Abrams, Berdo & Goodman, L.L.P.

(57) ABSTRACT

A set-top box, which allows a user to input a key command in real time while displaying an animation sequence on an on-screen display (OSD) screen, and a method of outputting the OSD data of the set-top box is provided. The set-top box includes OSD control module that divides OSD animation data into a plurality of subsets, loads each of the subsets in every operating cycle, determines whether a user has input a key command in every operating cycle, and selectively provides the loaded subsets based on the determination result in every operating cycle, wherein the OSD animation data realizes an animation sequence when displayed. The set-top box further includes a combination control module that receives the loaded subsets of the OSD animation data from the OSD control module and overlays the data onto the decoded broadcast signal and provides the overlaid result to a display device.

18 Claims, 9 Drawing Sheets

|    | 00 | 01 | 02 | 03 | 04 | 05 | 06 | 07 | 08 | 09 | 0A | 0B | 0C | 0D | 0E | 0F |
|----|----|----|----|----|----|----|----|----|----|----|----|----|----|----|----|----|
| 00 | F1 | F2 | F3 | F4 | F5 | F6 | F7 | F8 | F9 | F10| ...|    |    |    |    |    |
| 10 |    |    |    |    |    |    |    |    |    |    |    |    |    |    |    |    |
| 20 |    |    |    |    |    |    |    |    |    |    |    |    |    |    |    |    |
| 30 |    |    |    |    |    |    |    |    |    |    |    |    |    |    |    |    |
| 40 |    |    |    |    |    |    |    |    |    |    |    |    |    |    |    |    |
| 50 |    |    |    |    |    |    |    |    |    |    |    |    |    |    |    |    |
| 60 |    |    |    |    |    |    |    |    |    |    |    |    |    |    |    |    |
| 70 |    |    |    |    |    |    |    |    |    |    |    |    |    |    |    |    |
| 80 |    |    |    |    |    |    |    |    |    |    |    |    |    |    |    |    |
| 90 |    |    |    |    |    |    |    |    |    |    |    |    |    |    |    |    |
| A0 |    |    |    |    |    |    |    |    |    |    |    |    |    |    |    |    |
| B0 |    |    |    |    |    |    |    |    |    |    |    |    |    |    |    |    |
| C0 |    |    |    |    |    |    |    |    |    |    |    |    |    |    |    |    |
| D0 |    |    |    |    |    |    |    |    |    |    |    |    |    |    |    |    |
| E0 |    |    |    |    |    |    |    |    |    |    |    |    |    |    |    |    |
| F0 |    |    |    |    |    |    |    |    |    |    |    |    |    |    |    |    |

FIG. 9

SET-TOP BOX ALLOWING KEY COMMAND INPUT WHILE DISPLAYING ANIMATION SEQUENCE ON OSD SCREEN AND METHOD OF DISPLAYING OSD DATA

CROSS-REFERENCE TO RELATED APPLICATIONS

This application claims the benefit under 35 U.S.C. §119 (a) of Korean Patent Application No. 10-2004-0049649 filed in the Korean Intellectual Property Office on Jun. 29, 2004, the entire disclosure of which is incorporated herein by reference.

BACKGROUND OF THE INVENTION

1. Field of the Invention

The present invention relates to a set-top box. More specifically, the present invention relates to a set-top box which allows a key command to be input thereto in real time while displaying animation data on an on-screen display (OSD) screen and a method of outputting OSD data of the set-top box.

2. Description of the Related Art

In digital broadcasting unlike analog broadcasting, a viewer can obtain various information about a digital broadcast program or a video-on-demand (VOD) program while watching the program because a broadcasting station transmits information about the digital broadcast program or the VOD program along with the program (hereinafter referred to as "information data"). Therefore, in order to watch a digital broadcast program or a VOD program transmitted by a broadcasting station, a viewer must have a TV and a set-top box that is capable of receiving and reproducing digital broadcast programs, or a television in which such a set-top box is installed.

Information data can be displayed in an on-screen display (OSD) screen, or it can be arranged on the entire screen of a display device.

Figure 1:
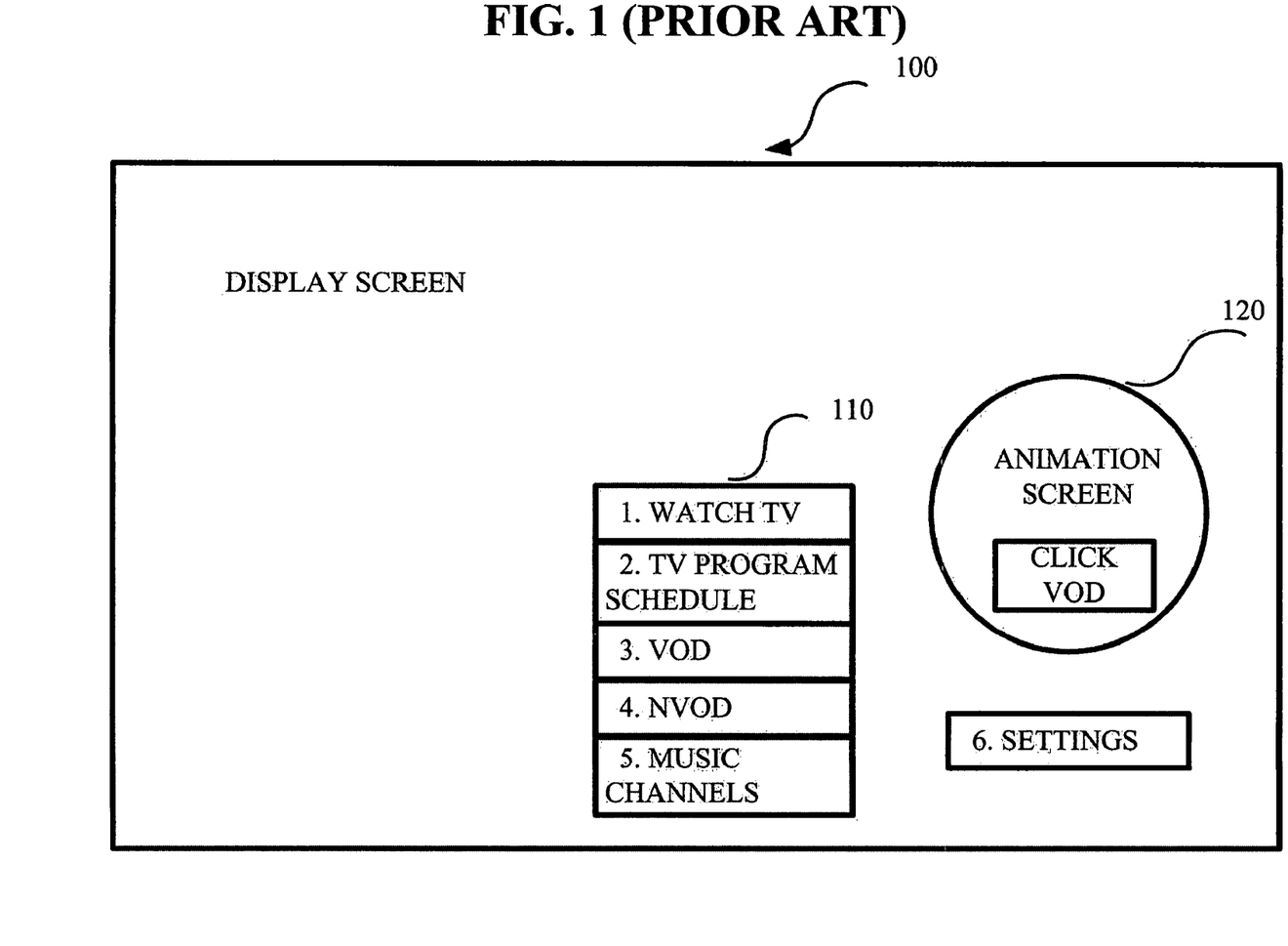
FIG. 1 is a diagram illustrating a display screen produced using a conventional method of outputting OSD data.

FIG. 1 is a diagram illustrating a display screen produced using a conventional method of outputting OSD data. Referring to FIG. 1, information is overlaid on a display screen 100 on which a digital broadcast program, such as a movie, is displayed. If a user presses a menu key while the movie is showing, a menu bar 110 and bitmap animation data 120 related to the menu key selected by the user, are overlaid on a lower portion of the display screen 100.

Figure 2:
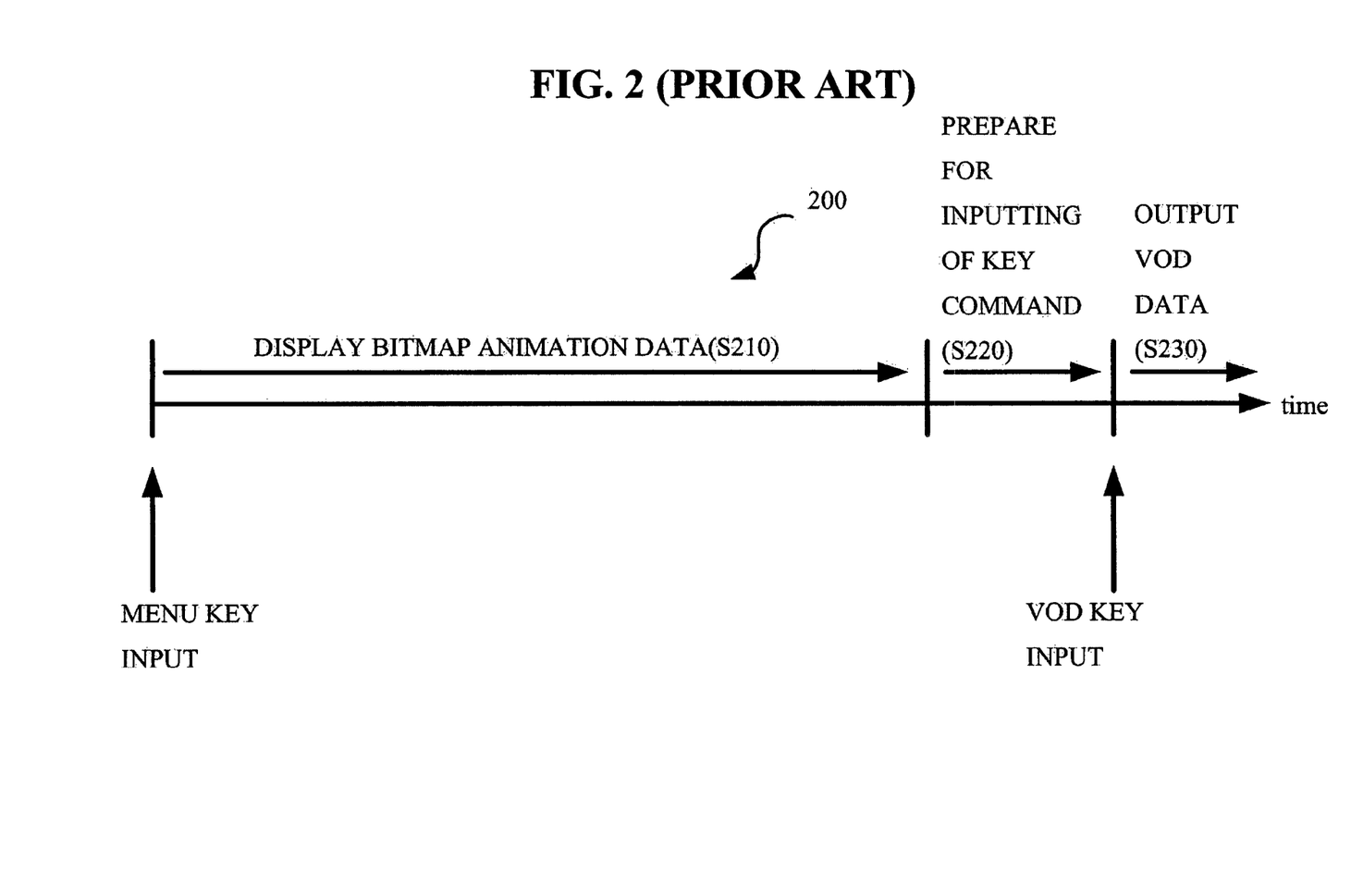
FIG. 2 is a diagram illustrating a conventional method of outputting OSD data.

FIG. 2 is a diagram illustrating a conventional method of outputting OSD data.

Referring to FIG. 2, the horizontal axis represents the passage of time and is divided into a plurality of sections corresponding to a plurality of operations of the conventional OSD method, that is, operations S210, S220, and S230. When a user presses a menu key, OSD animation data (for example, the bitmap animation data 120 of FIG. 1) is executed on a display screen (for example, the display screen 100 of FIG. 1) in operation S210. The OSD animation data may be comprised of a plurality of image files. Preferably, the OSD animation data may be comprised of a plurality of bitmap files, but is not limited thereto. If, for example, the OSD animation data is comprised of a total of 10 bitmap files and the 10 bitmap files are displayed at intervals of 0.5 seconds, it takes 5.0 seconds to execute the entire OSD animation data, that is, operation S210 lasts for about 5 seconds. While displaying the OSD animation data, the set-top box cannot perform other operations, such as receiving a key command input via, for example, a remote controller. Thereafter, in operation S220, the set-top box stands by, waiting for a user to input a key command thereto. In operation S230, the set-top box can receive a VOD key command input by the user, and it can display VOD image data in response to the received command.

With existing OSD systems, a user is required to wait until the execution of the bitmap animation, which is always the same and is often tedious. As such, having to repeatedly watch the bitmap animation without being able to skip it is likely to bore or irritate the user.

Accordingly, a need exists for a system and method which can accept a key command input while animation data is displayed on an on-screen display (OSD).

SUMMARY OF THE INVENTION

The present invention provides a set-top box which allows a key command to be input thereto in real time while displaying animation data on an on-screen display (OSD) screen in digital broadcasting, and a method of outputting the OSD data of the set-top box.

The above stated objects as well as other objects, features and advantages of the present invention will become clear to those skilled in the art upon review of the following description.

According to an aspect of the present invention, a set-top box is provided comprising a reception module that receives digital broadcast signals, a demultiplexer that extracts a broadcast signal of a channel selected by a user from the received digital broadcast signals, and a decoding module that decodes the extracted broadcast signal using a predetermined method. The set-top box further comprises an on-screen display (OSD) control module that divides OSD animation data into a plurality of subsets, loads each of the subsets in every operating cycle, determines whether a user has input a key command in every operating cycle, and selectively provides the loaded subsets based on the determination result in every operating cycle, wherein the OSD animation data produces an animation sequence when displayed. The set-top box still further comprises a combination control module that receives the loaded subsets of the OSD animation data from the OSD control module, overlays them onto the decoded broadcast signal, and provides the overlaid result to a display device.

According to another aspect of the present invention, a method of outputting the OSD data of a set-top box is provided including the steps of (a) dividing OSD animation data into a plurality of subsets, wherein the OSD animation data produces an animation sequence when displayed, (b) loading each of the OSD animation data subsets in every operating cycle, and (c) determining whether a user has input a key command in every operating cycle and selectively displaying the loaded subsets of the OSD animation data.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF THE EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art.

The present invention will now be described in greater detail with reference to the accompanying drawings, in which, exemplary embodiments of the invention are shown.

Figure 3:
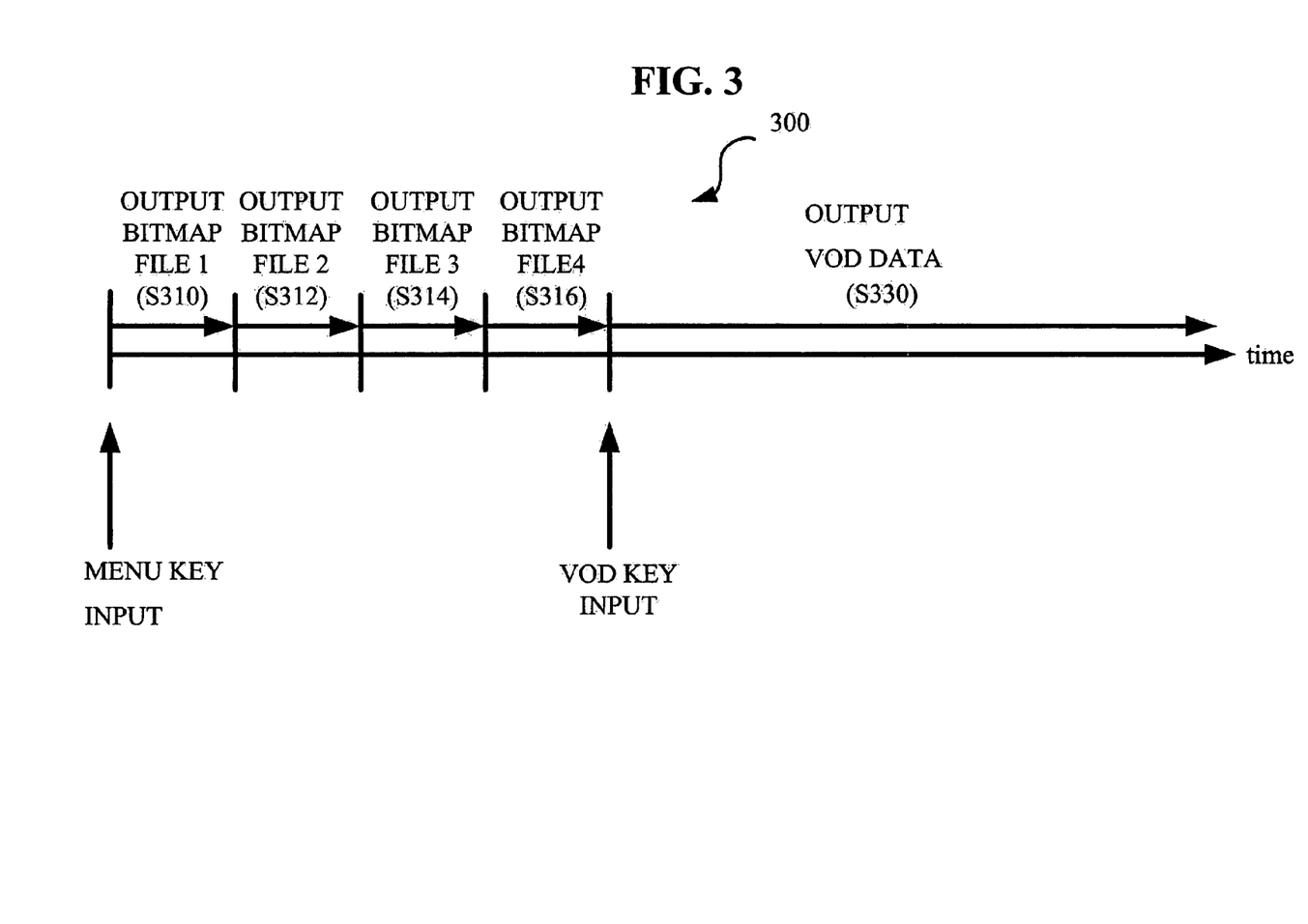
FIG. 3 is a diagram illustrating a method of outputting OSD data according to an exemplary embodiment of the present invention.

FIG. 3 is a diagram illustrating a method of outputting OSD data according to an exemplary embodiment of the present invention.

Referring to FIG. 3, the horizontal axis represents the passage of time and is divided into a plurality of sections corresponding to a plurality of operations of the method of outputting OSD data, that is, operations S310, S312, S314, S316, and S330.

When a user presses a menu key, animation data (for example, the bitmap animation data 120 of FIG. 1) is executed in an OSD screen. The OSD animation data is comprised of a plurality of image files, for example, a plurality of bitmap files. In an example for illustrating the method of FIG. 3, the OSD animation data can be comprised of a total of 10 bitmap files and the 10 bitmap files can be classified into 5 subsets that are displayed individually. Accordingly, in operations S310 through S316 of FIG. 3, the 5 subsets are sequentially displayed in response to a predetermined signal. The number of image files constituting each of the subsets is larger than 1, but smaller than the total number of image files constituting the OSD animation data. Thereafter, it can be determined whether a key command has been input by a user for a process which can be carried out before or after each of the bitmap files of the OSD animation data is displayed.

Alternatively, one of the subsets can be loaded, and then it can be determined whether a key command has been input by the user before or after a bitmap file from this subset is displayed. Accordingly, it is possible to actively respond to various control requests issued by the user, including those issued in the middle of displaying the OSD animation data. In FIG. 3, the fourth bitmap file is output in operation S316, and then a VOD key command is input by the user. Accordingly, VOD image data is output in operation S330 in response to the VOD key command without displaying the fifth through tenth bitmap files.

Figure 4:
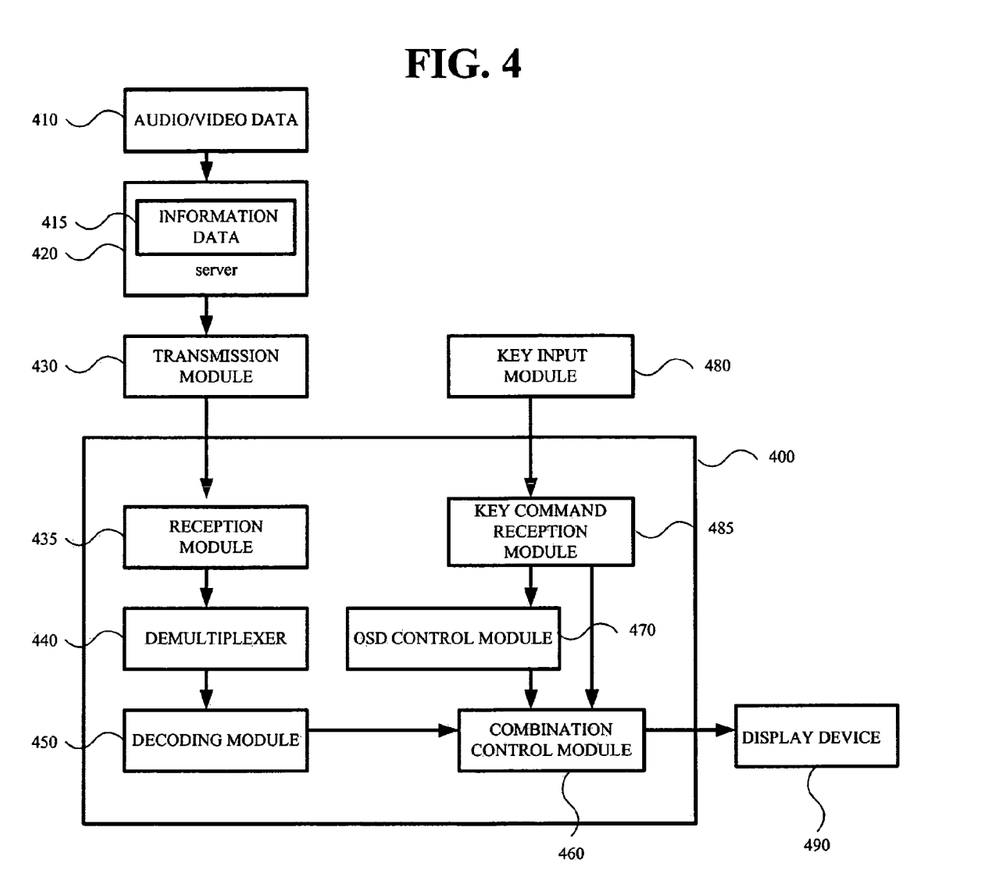
FIG. 4 is a block diagram of a set-top box which displays OSD data according to an exemplary embodiment of the present invention.

FIG. 4 is a block diagram of a set-top box 400, which displays OSD data according to an exemplary embodiment of the present invention.

Referring to FIG. 4, a transmission server 420 of a broadcasting station receives audio/video data 410 and information data 415, and transmits the data to a transmission module 430. The transmission module 430 generates digital broadcast signals as a packetized bitstream based on the audio/video data 410 and the information data 415 through digital modulation, and transmits the packetized bitstream to the set-top box 400, which is capable of receiving and reproducing digital broadcast programs.

A reception module 435 of the set-top box 400 receives the packetized bitstream transmitted by the transmission module 430. The reception module 435 performs both tuning and demodulation. A demultiplexer 440 extracts a digital broadcast signal of a channel selected by a viewer from the packetized bitstream received by the reception module 435. A decoding module 450 decodes the audio/video data 410 and information data 415 contained in the extracted digital broadcast signal that has been compressed using the MPEG2 digital TV standard for video and audio compression. In an embodiment of the present invention, the OSD data may be data embedded in the set-top box 400 or it may be decoded information data. The decoded information data preferably includes metadata related to audio/video data, but is not limited thereto. Alternatively, information data contained in a digital broadcast signal may include OSD animation data.

The decoding module 450 may be separated into an audio/video decoding module and an information decoding module. The digital data decompression method used by the audio/video decoding module and the information decoding module may be the MPEG4 or H.264 decoding method. A combination control module 460 overlays the decoded audio/video data with the decoded information data, graphically processes the combination, and then outputs the results to a display device 490, such as a TV monitor, a liquid crystal display (LCD), a plasma panel display (PDP), or the like.

A key input module 480 is used for adjusting the operating state of the set-top box 400. A key command reception module 485 receives a key command and sends an operating signal corresponding to the received key command to an OSD control module 470 and/or the combination control module 460. The OSD control module 470 generates a timer message at regular intervals, determines whether there is a timer message in a queue, and sends the OSD data including OSD animation data (for example, bitmap animation data) to the combination control module 460 if there is a timer message in the queue. If the operating signal generated by the key command reception module 485 exists in the queue, the OSD control module 470 stops generating a timer message.

The combination control module 460 provides the OSD data, the decoded audio/video data, and the decoded information data so that the data can be overlaid on the screen of the display device 490. The combination control module 460 extracts a portion of image data where the OSD data is to be positioned when displayed, and overlays the extracted portion onto the original image data. Thereafter, the combination control module 460 overlays the OSD data with the original image data and sends the results to the display device 490.

The term "module", as used herein, denotes a software or hardware component, such as a Field Programmable Gate Array (FPGA), an Application Specific Integrated Circuit (ASIC), or the like, which performs certain tasks, but is not limited thereto. A module may be configured to reside in an addressable storage medium, and may be configured to execute on one or more processors. Thus, a module may include, by way of example, components such as software components, object-oriented software components, class components, task components, processes, functions, attributes, procedures, subroutines, segments of program code, drivers, firmware, microcode, circuitry, data, databases, data structures, tables, arrays, and variables. The components and modules may be combined into fewer components and modules, or may be further separated into additional components and modules. In addition, the components and modules may be implemented such that they are executable on one or more computers or host devices in a communication system.

Figure 5:
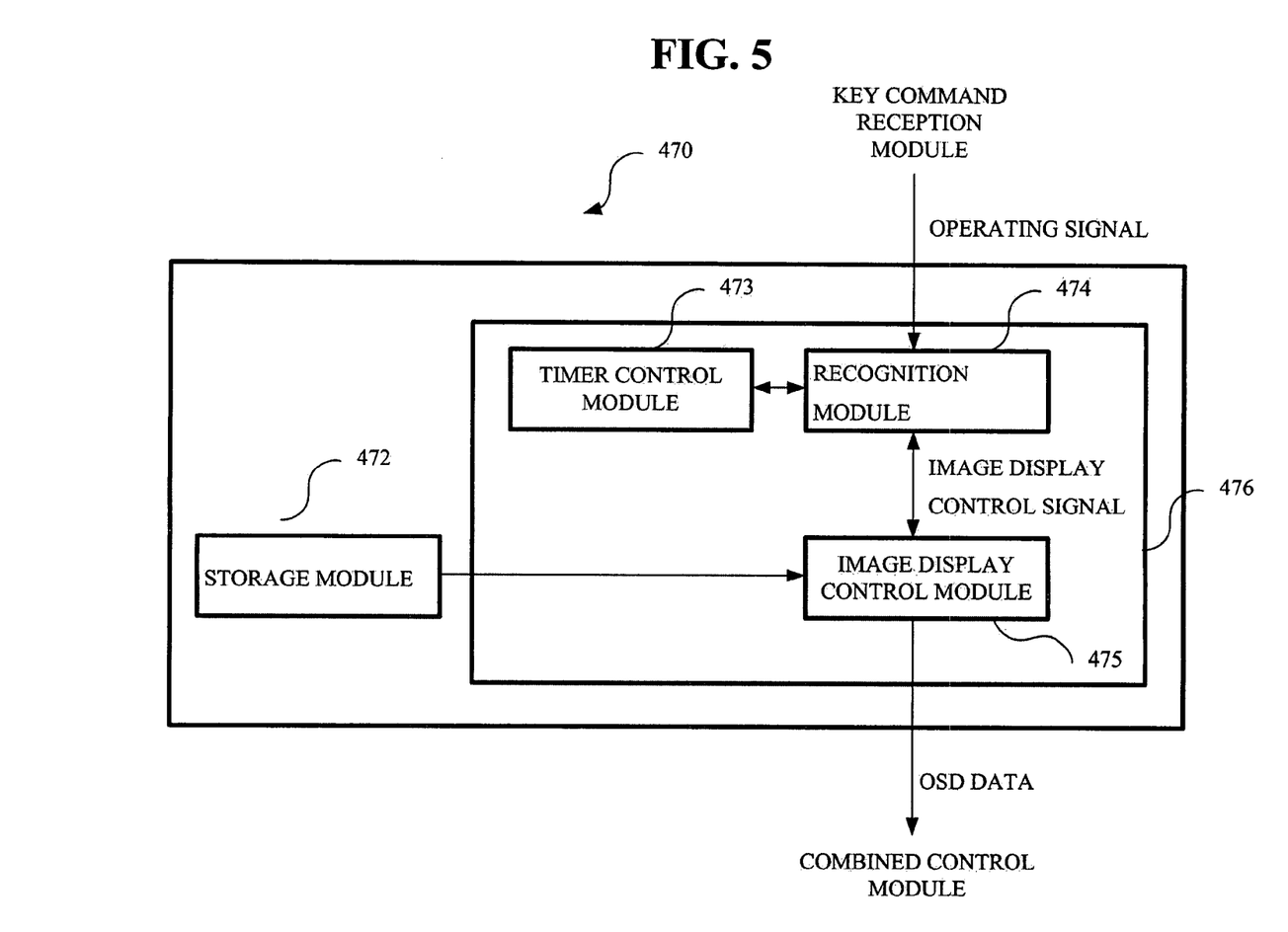
FIG. 5 is a detailed block diagram of an OSD control module of FIG. 4.

FIG. 5 is a detailed block diagram of an OSD control module 470 of FIG. 4.

Referring to FIG. 5, the OSD control module 470 comprises a storage module 472 that stores a program and OSD animation data, and a control module 476 that displays the OSD animation data. The storage module 472 includes a ROM for storing the program, and a VRAM for storing bitmap files of the OSD animation data. The storage module 472 may further include storage devices other than a ROM or a VRAM. In addition, the storage module 472 can store not only bitmap files, but also store other types of still image files such as JPEG files.

Figure 6:
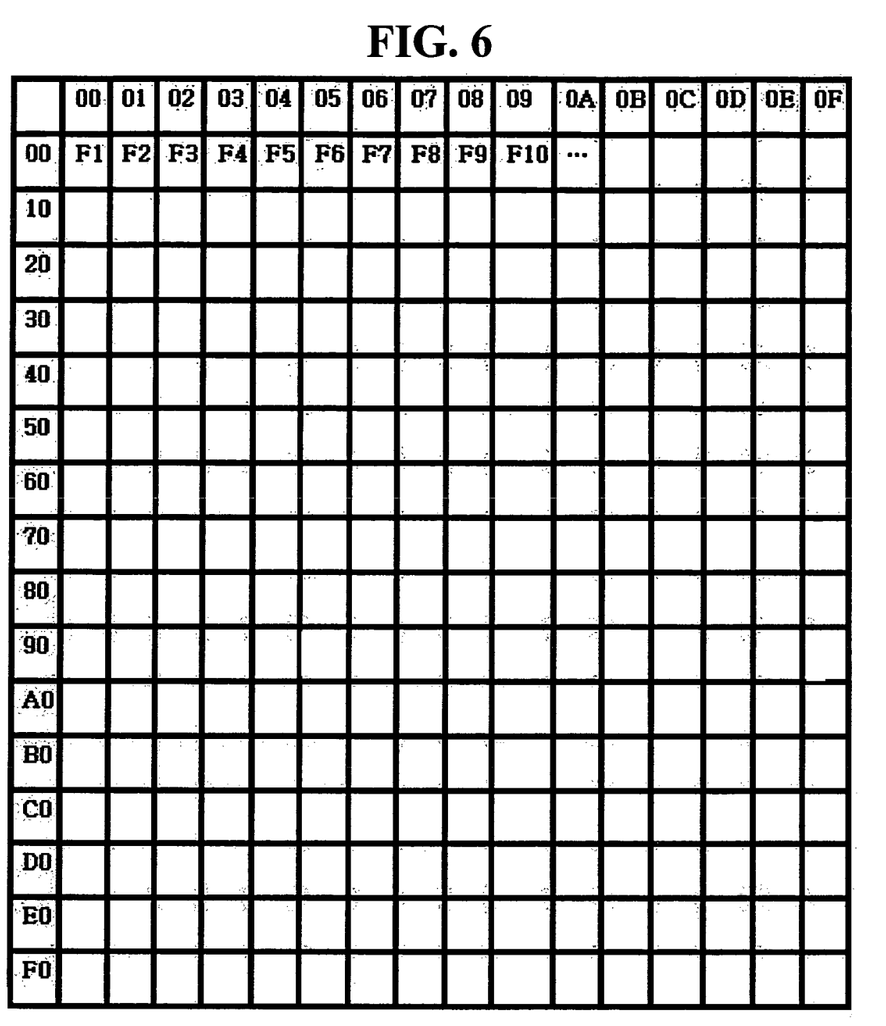
FIG. 6 is a diagram illustrating the structure of a video random access memory (VRAM) included in a storage module of FIG. 4.

FIG. 6 is a diagram illustrating the structure of a VRAM included in the storage module 472 of FIG. 5. Referring to FIG. 6, still images are stored in a total of 256 addresses of the VRAM, that is, addresses "0000" through "F00F". Preferably, each of the still images is an image file to be displayed in an OSD screen, but is not limited thereto, and each is allotted to, and is stored in, one of the addresses of the VRAM. For example, a first bitmap file F1 may be stored in address "0000", and a second bitmap file F2 may be stored in address "0001".

Referring back to FIG. 5, the control module 476 comprises a timer control module 473, a recognition module 474, and an image display control module 475. The timer control module 473 sets a predetermined operating cycle, and sets and executes a timer tick function, which generates a timer tick according to the predetermined operating cycle. The timer control module 473 further generates a timer message and stores the timer message in a queue whenever a timer tick is generated. In an example for illustrating the control module 470 of FIG. 5, "n" can be used to indicate the number of times OSD animation data has been displayed. If n=1, a timer tick callback function is registered, and the timer tick callback function is executed when a timer tick is generated. Here, the timer tick function can be replaced with any type of function that can be executed according to a predetermined operating cycle. The recognition module 474 determines whether an operating signal generated by the key command reception module 485 based on an input key command, or the timer message generated by the timer control module 473, exists in the queue, and transmits an image display control signal to the image display control module 475.

The image display control module 475 receives the image display control signal from the recognition module 474 and the OSD animation data from the storage module 472, and provides the OSD data to the combination control module 460 so that the OSD animation can be displayed. If the image display control module 475 receives the OSD animation data in the form of bitmap files, the image display control module 475 may load at least one of the bitmap files. The type and number of image files constituting each subset may be determined in advance during the process of manufacturing the set-top box 400, or this may be determined later by a user. The combination control module 460 sends decoded audio/video data, decoded information data, and the OSD data to the display device 490. In another embodiment of the present invention, the OSD control module 470 may not include the control module 476, in which case, the combination control module 460 controls the displaying of the OSD data.

Figure 7:
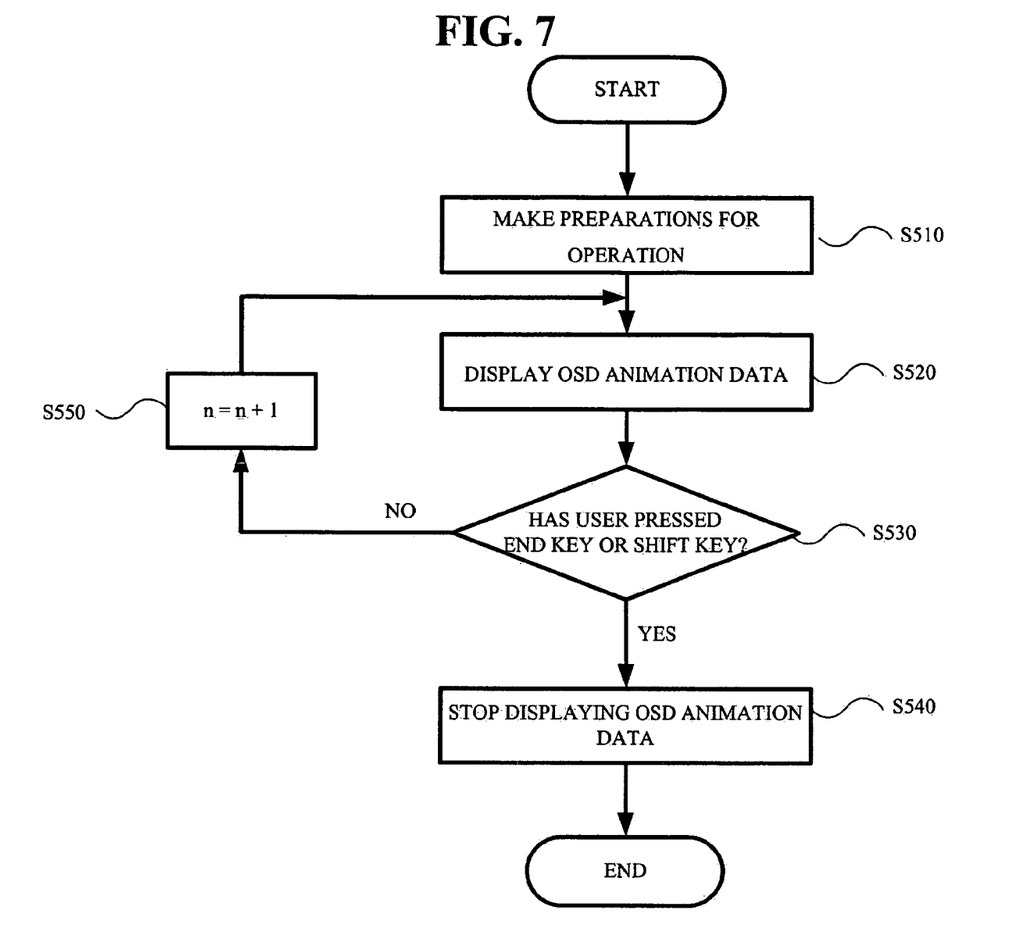
FIG. 7 is a flowchart of a method of outputting OSD data according to an exemplary embodiment of the present invention.

FIG. 7 is a flowchart of a method of outputting OSD data according to an exemplary embodiment of the present invention.

Referring to FIG. 7, in operation S510, a predetermined operating cycle is set, and a timer tick function is set and executed according to the predetermined operating cycle. In addition, in operation S510, a timer tick callback function is registered.

In operation S520, a timer message is generated when a timer tick is generated, and the OSD animation data to be output is then registered and output.

In operation S530, the operating signal received via the key command reception module is analyzed to determine whether a user has pressed an end key or a shift key. If the user has not yet pressed the end key or the shift key, a "1" is added to "n" (that is, the number of times the OSD animation has been displayed) at operation S550, and then the method returns to operation S520. However, if the user has pressed the end key or the shift key, timer tick generation is stopped, and the "n" value and the sequence of image files are all re-initialized in operation S540.

A timer message and an operating signal accumulate in a queue in a predetermined order. Thus, it is possible to determine whether there is an operating signal based on whether there is a timer message in the queue. Accordingly, if an operating signal exists in the queue, the OSD animation may be stopped without outputting a bitmap file thereof, which was to be output the moment the OSD animation was stopped.

Operations S510 and S520 of FIG. 7 will now be described in greater detail with reference to FIGS. 8 and 9.

Figure 8:
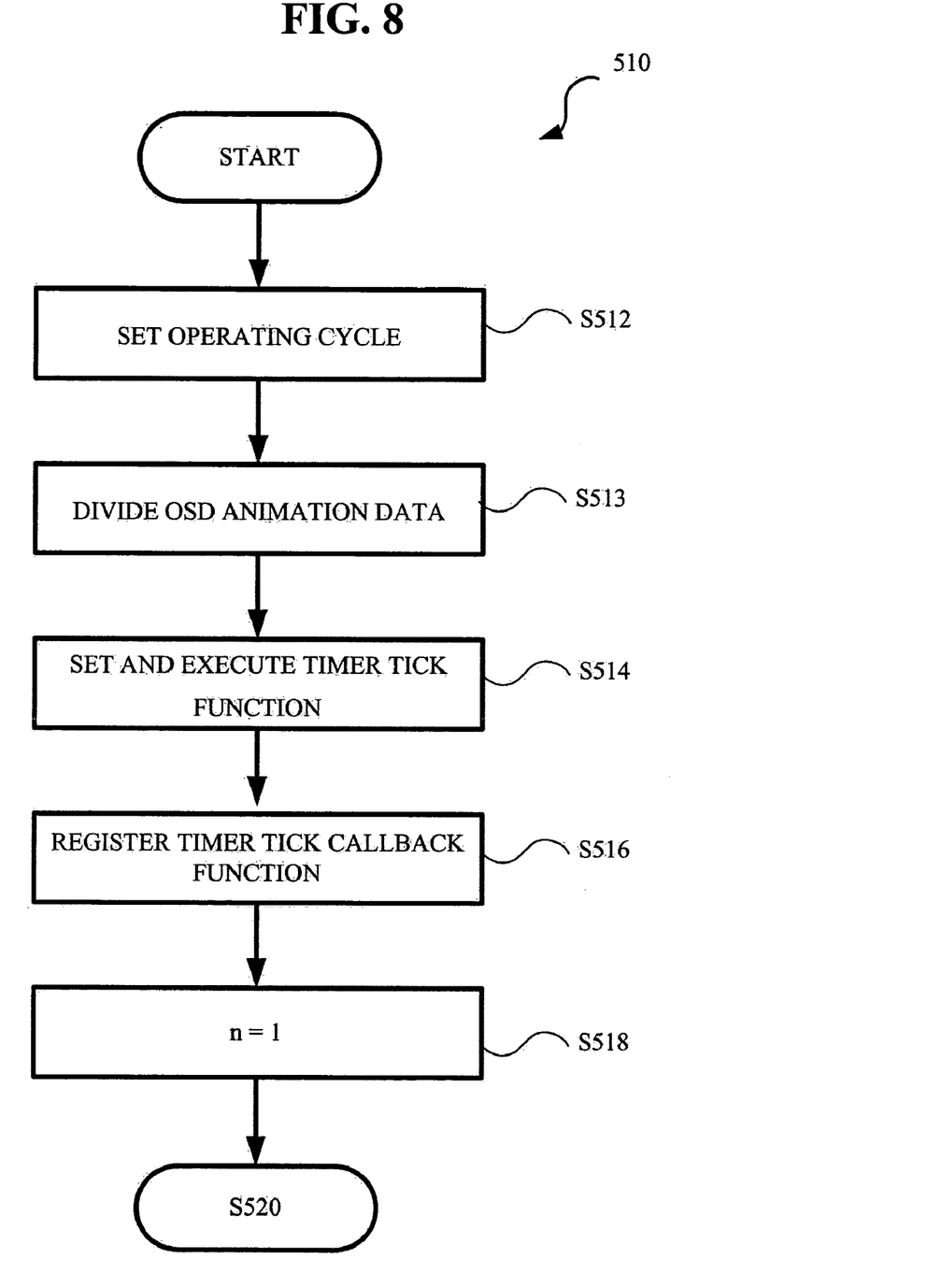
FIG. 8 is a detailed flowchart of operation S510 of FIG. 7.

FIG. 8 is a detailed flowchart of operation S510 of FIG. 7.

Referring to FIG. 8, a user first sets an operating cycle in operation S512 by pressing a menu key. The operating cycle may be determined by the user, or it may have already been determined by a manufacturer during the manufacturing process of the set-top box. For example, the operating cycle may be 0.5 seconds, but is not limited thereto. In operation S513, the OSD animation data is divided into a plurality of subsets, which realizes a consecutive animation sequence when displayed according to the operating cycle. Specifically, in operation S513, units in which the OSD animation data is to be loaded and displayed in operation S528 are determined. As described above, each of the subsets of the OSD animation data consists of one or more bitmap files. The number of bitmap files may have already been determined during the manufacturing process of the set-top box, or it may be determined later by a user.

Alternatively, the number of bitmap files may be automatically determined based on the operating cycle set in operation S512. For example, if the operating cycle is 0.5 seconds, the set-top box may be programmed to display single OSD animation data every 0.5 seconds. If the operating cycle is 1 second, the set-top box may be programmed to display multiple (for example, two) OSD animation data every second.

In operation S514, a timer tick function, which is to be driven according to the operating cycle set in operation S512, is set and then executed. The timer tick function generates a timer message every 0.5 seconds, and it also executes a timer tick callback function. Therefore, in operation S516, the timer tick callback function is registered within 0.5 seconds of the timer tick function execution. The timer tick callback function reads a timer message stored in a queue and outputs the OSD animation data which is registered. Since the OSD animation data subsets should preferably be output in a predetermined order whenever a timer message is generated, it is necessary to check how many times the subsets have been output. In operation S518, an initialization operation is performed by setting the "n" value to 1.

The setting of the operating cycle, and the setting and executing of the timer tick function may be implemented as a VxWORKS-based program described below as,

```
static void sec_prepareVodAniIconInMenu(void)
{
sec_VodAniMenuTick =
tick_create(tick_timer_vod_ani_menu_callback, (void
    *)NULL, "VOD_ANI");
    if (!sec_VodAniMenuTick) {
    trace_new(TRACE_MPG|TRACE_LEVEL_ALWAYS, "Can't
    create VodAniMenuTick!\n");
        error_log(ERROR_FATAL);
    }
    b_VodAniMenuTickCreated = TRUE;
    tick_set( sec_VodAniMenuTick, VodAniMenuTickTimeMS, FALSE);
    tick_start(sec_VodAniMenuTick);
}
``` wherein sec_VodAniMenuTick is a timer tick function that generates a timer tick at the predetermined time interval VodAniMenuTickTimeMS, and executes a timer tick callback function tick_timer_vod_ani_menu_callback whenever generating a timer tick, tick_set indicates the setting of the timer tick function sec_VodAniMenuTick, tick_start indicates the state of the execution of the timer tick function sec_VodAniMenuTick, and the if clause indicates that the message "Can't create VodAniMenuTick!" is output when a timer tick is not generated.

The timer tick callback function tick_timer_vod_ani_menu_callback can also be implemented as a VxWORKS-based program described below as,

```
static void tick_timer_vod_ani_menu_callback(tick_id_t hTick,
void *pUser)
{
    u_int32 message[4];
    int ret_code;
    message[0] = DN_FROM_TIMER;
    message[1] = DN_VOD_ANI_ICON_INMENU;
    message[2] = DN_DOWN_EVENT;
    ret_code = qu_send( secMenuInput_queue, message);
    if ( ret_code != RC_OK)
        isr_trace_new(TRACE_ALL | TRACE_LEVEL_ALWAYS,
        "tick_timer_vod_ani_menu_callback %d \n",ret_code, 0);
}
``` wherein DN_VOD_ANI_ICON_INMENU is a timer message that enables a plurality of bitmap files to be output in a predetermined order when recognized in a queue, ret_code is responsible for sending timer messages to the queue, and RC_OK is a message that is generated when the sending of the timer message has failed. Here, if the ret_code is not RC_OK, a message "tick_timer_vod_ani_menu_callback" is output.

Figure 9:
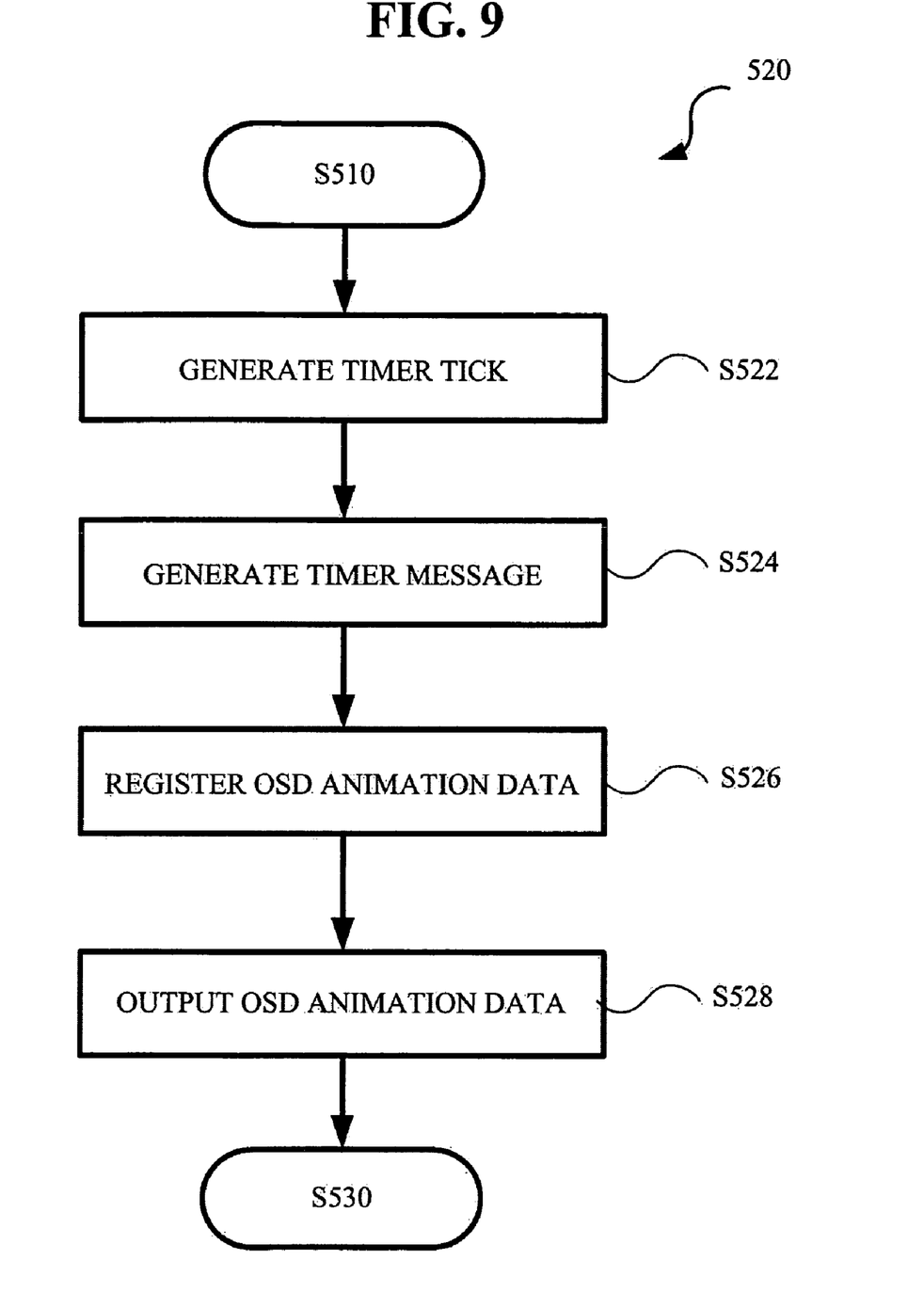
FIG. 9 is a detailed flowchart of operation S520 of FIG. 7.

FIG. 9 is a detailed flowchart of operation S520 of FIG. 7.

Referring to FIG. 9, in operation S522, a timer tick is generated. In operation S524, a timer message is generated. In operation S526, subsets of the OSD animation data to be sequentially output are registered, and in operation S528 these subsets are sequentially output whenever a timer message is generated.

Specifically, in operation S526, the OSD animation data subsets are registered by loading each in units determined by operation S513 of FIG. 8. Accordingly, in operation S526, each of the subsets may be loaded in units of image files or in units of groups of image files.

In operation S528, the combination control module 460 of FIG. 4 overlays the OSD data containing the OSD animation data, decoded audio/video data, and decoded information data on one screen and sends the results to the display device of FIG. 4. Preferably, one image file can be overlaid onto one frame of the decoded audio/video data, but is not limited thereto. However, the number of image files that can be overlaid onto one frame of the decoded audio/video data may change.

The process of overlaying the OSD data, the decoded audio/video data, and the decoded information data on one screen will now be described in greater detail. The combination control module 460 of FIG. 4 extracts a portion of the image data where the OSD data is to be positioned from the entire video data, and overlays the extracted portion onto the original image data. Thereafter, the combination control module 460 further overlays the overlaid OSD data onto the original image data and sends the result to the display device 490. In a second alternative, the combination control module 460 may overlay the OSD data onto the original image data and then overlay the extracted portion onto the original image data. In a third alternative, the combination control module 460 simultaneously overlays both the extracted portion and the OSD data onto the original image data.

The outputting of one or more image files of each of the OSD animation data subsets whenever a timer message is recognized may be implemented by the VxWORKS-based program described below as,

```
void sec_DistributeKeyinProgramList(u_int16 key)
{
    .........
    switch(key)
    {
        case DN_VOD_ANI_ICON_INMENU:
        is_first_image++;
        VOD_DrawVodAniIcon( is_first_image, sec_GrpPlane1 );
        break;
        .........
    }
}
``` wherein an ellipsis '. . .' indicates that the middle part of the VxWORKS-based program is omitted, and DN_VOD_ANI_ICON_INMENU is a timer message. When the timer message DN_VOD_ANI_ICON_INMENU is recognized, is_first_image represents the value "n", which was previously described, that is, it is a bitmap file serial number. Accordingly, a bitmap file designated by this serial number is reproduced on a screen sec_GrpPlane1 using a function VOD_DrawVodAniIcon.

According to the embodiments of the present invention, it is possible for a user to input a key command in real time while an animation sequence is being displayed on an OSD screen without having to wait for the animation to finish.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A set-top box, comprising:
 a reception module for receiving digital broadcast signals;
 a demultiplexer for extracting a broadcast signal of a channel selected by a user from the received digital broadcast signals;
 a decoding module for decoding the extracted broadcast signal using a predetermined method;
 an on-screen display (OSD) control module for dividing OSD animation data into a plurality of subsets, loading each of the subsets in an operating cycle, determining whether a user has input a key command in an operating cycle defined by a period of time, and selectively providing the loaded subsets based on the determination result in an operating cycle, wherein the subsets of the OSD animation data produces a moving picture when displayed; and
 a combination control module for receiving the loaded subsets from the OSD control module and overlaying them onto the decoded broadcast signal, and providing the overlaid result to a display device.

2. The set-top box of claim 1, further comprising the on-screen display (OSD) control module for dividing OSD animation data into a plurality of subsets, loading each of the subsets in every operating cycle, determining whether a user has input a key command in every operating cycle, and selectively providing the loaded subsets based on the determination result in every operating cycle, wherein the OSD animation data produces an animation sequence when displayed.

3. The set-top box of claim 1, wherein:
 the OSD animation data is comprised of a plurality of image files; and
 each OSD animation data subset is comprised of at least one image file.

4. The set-top box of claim 3, wherein the image files are bitmap files.

5. The set-top box of claim 1, wherein the OSD control module is programmable to:
 set a timer that generates a timer signal in an operating cycle;
 registers a callback function that is to be executed whenever the timer signal is generated; and
 load each of the OSD animation data subsets using the callback function when the timer signal is generated.

6. The set-top box of claim 5, wherein the OSD control module is programmable to set a timer that generates a timer signal in every operating cycle.

7. The set-top box of claim 5, wherein the OSD control module comprises:
 a timer control module for providing the timer signal at regular intervals;
 a recognition module for determining whether a user has input a key command whenever the timer signal is generated and providing an image display control signal as the determination result; and
 an image display control module for loading each of the OSD animation data subsets and selectively providing the loaded subsets in response to the image display control signal.

8. The set-top box of claim 7, wherein the key command comprises a key command generated when the user presses an end key or a shift key.

9. A method of outputting OSD data of a set-top box, comprising the steps of:
 dividing the OSD animation data into a plurality of subsets, wherein the subsets of the OSD animation data produces a moving picture when displayed;
 loading each of the OSD animation data subsets in an operating cycle, where the operating cycle is defined by a period of time; and
 determining whether a user has input a key command in an operating cycle and selectively displaying the loaded subsets of the OSD animation data.

10. The method of claim 9, wherein the step of loading each of the OSD animation data subsets comprises the step of loading each of the OSD animation data subsets in every operating cycle.

11. The method of claim 9, wherein the step of determining whether a user has input a key command comprises the steps of determining whether a user has input a key command in every operating cycle and selectively displaying the loaded subsets of the OSD animation data.

12. The method of claim 9, wherein the OSD animation data is comprised of a plurality of image files, and each of the OSD animation data subsets is comprised of at least one image file.

13. The method of claim 12, wherein the image files are bitmap files.

14. The method of claim 9, wherein the step of dividing the OSD animation data comprises the steps of:
 setting an operating cycle; and
 dividing the OSD animation data into subsets according to the operating cycle.

15. The method of claim 14, wherein the step of loading each of the OSD animation data subsets comprises the steps of:
 setting a timer that generates a timer signal in an operating cycle;
 registering a callback function that is to be executed whenever the timer signal is generated; and
 loading each of the OSD animation data subsets using the callback function when the timer signal is generated.

16. The method of claim 15, wherein the step of setting a timer comprises the step of setting a timer that generates a timer signal in every operating cycle.

17. The method of claim 15, wherein the step of determining whether a user has input a key command comprises the steps of:
 determining whether a user has input a key command when the timer signal is generated; and
 deciding not to display the loaded subsets of OSD animation data if the user has input a key command and displaying the loaded subsets if the user has not yet input a key command.

18. The method of claim 17, wherein the key command comprises a key command generated when the user presses an end key or a shift key.

* * * * *

UNITED STATES PATENT AND TRADEMARK OFFICE
CERTIFICATE OF CORRECTION

PATENT NO.      : 7,620,971 B2                                     Page 1 of 1
APPLICATION NO. : 11/168558
DATED           : November 17, 2009
INVENTOR(S)     : Jae-joon Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 898 days.

Signed and Sealed this

Twenty-sixth Day of October, 2010

David J. Kappos
*Director of the United States Patent and Trademark Office*